Sept. 21, 1937.  L. E. GODFRIAUX  2,093,757
MACHINE TOOL
Filed Jan. 9, 1936  5 Sheets-Sheet 1

INVENTOR
Louis Edward Godfriaux
BY
Fred G. Parsons
ATTORNEY

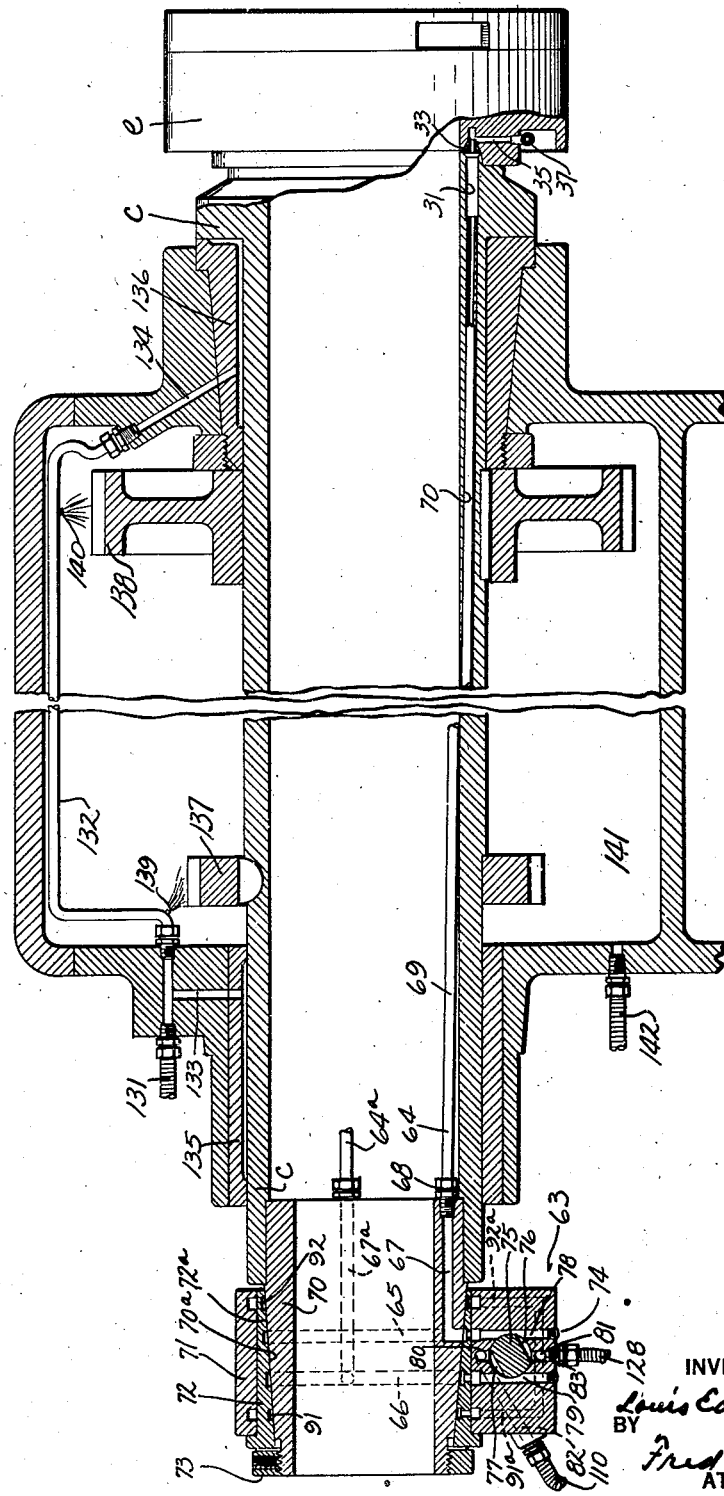

Sept. 21, 1937.  L. E. GODFRIAUX  2,093,757

MACHINE TOOL

Filed Jan. 9, 1936   5 Sheets-Sheet 4

INVENTOR
Louis Edward Godfriaux
BY
Fred G. Parsons
ATTORNEY

Sept. 21, 1937.   L. E. GODFRIAUX   2,093,757
MACHINE TOOL
Filed Jan. 9, 1936   5 Sheets—Sheet 5

INVENTOR
Louis Edward Godfriaux
BY
Fred G. Parsons
ATTORNEY

Patented Sept. 21, 1937

2,093,757

UNITED STATES PATENT OFFICE 2,093,757

MACHINE TOOL

Louis Edward Godfriaux, Madison, Wis., assignor to Gisholt Machine Company, Madison, Wis., a corporation of Wisconsin Application January 9, 1936, Serial No. 58,268

19 Claims. (Cl. 82—2)

This invention relates to machine tools, and more particularly to machines having power operable work or tool holding devices, such as lathes having power operable chucks.

A purpose of the invention is to provide improved transmission and control mechanism for the power operation of work or tool holding devices, such as chucks, and an improved combination and relationship of the transmission and control mechanism of the machine and the transmission and control mechanism for the device, together with an improved holding device, suited therefor.

A further purpose is to provide an improved hydraulic transmission, and control mechanism therefor, particularly suited for use with holding devices, such for instance as those shown in a co-pending application, Serial No. 59,335 filed January 16, 1936 and especially when the holding devices are rotatable with a lathe, or similar machine tool spindle.

Other purposes are to provide a machine tool having an improved power operable work or tool holding device mounted on a movable machine element, and improved means for carrying the power for operation of the device from a relatively stationary power source, and an improved source of power for the device, and improved means for controlling the power for operation of the device either during movement or when it is stationary; and more especially where the device is a chuck, and particularly for a lathe chuck.

Another purpose is generally to simplify and improve the construction of machine tools, and particularly of machines having devices for interchangeably holding a variety of work pieces or tools, and still other purposes will be apparent from this specification.

The invention consists in the construction and relationship of parts as herein illustrated, described and claimed and in such modification of the structure illustrated and described as is equivalent to the structure claimed.

In the specification the same reference characters have been used to indicate the same parts throughout, and in the drawings:

Fig. 4 is a vertical partial section taken along the axis of the spindle of the machine of Fig. 1, and enlarged.

Figure 1:
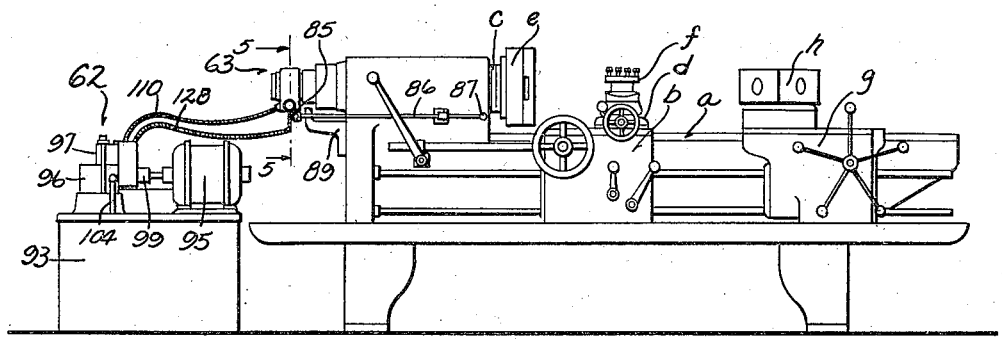
Fig. 1 is a front view of a lathe in which the invention is incorporated.

The machine here shown is a machine tool of the type commonly termed a turret lathe, having a bed or base $a$, Fig. 1, a tool carriage $b$ slidably guided on bed $a$ for movement in a direction parallel with the axis of a rotatable work spindle $c$, a cross slide $d$ slidably guided on carriage $b$ for movement transverse to the spindle axis, a chuck $e$ fixed on spindle $c$, and a turret tool post $f$ carried by the cross slide. The lathe also includes a turret carriage $g$ slidably guided on the bed, and an indexable tool turret $h$.

Figure 6:
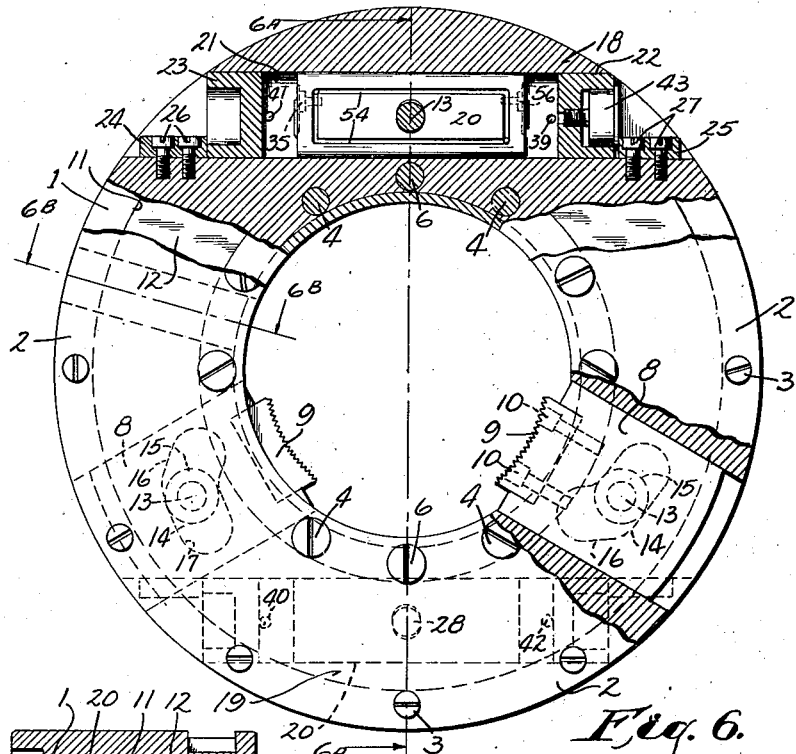
Fig. 6 is an elevation, partly in section, and enlarged, of a chuck shown in Fig. 1, viewed from the right in Fig. 1.
Figure 6A:
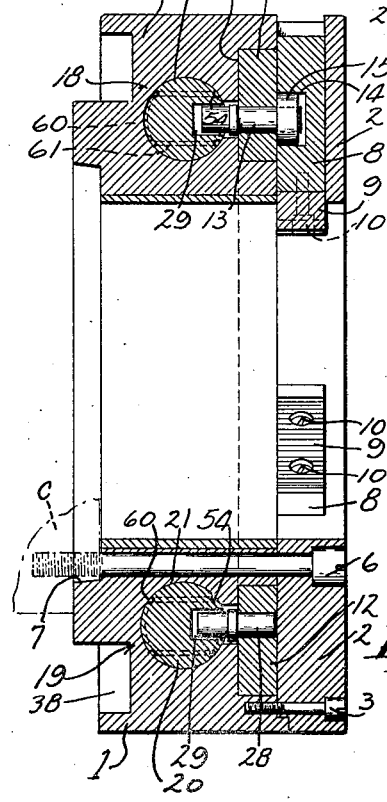
Fig. 6A is a section taken approximately along line 6A—6A of Fig. 6.
Figure 6B:
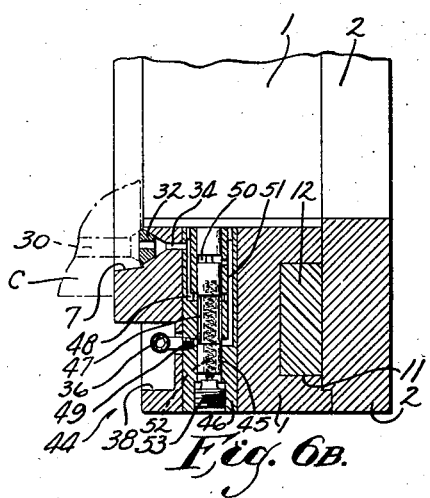
Fig. 6B is a partial section taken approximately along line 6B—6B of Fig. 6.
Figure 6C:
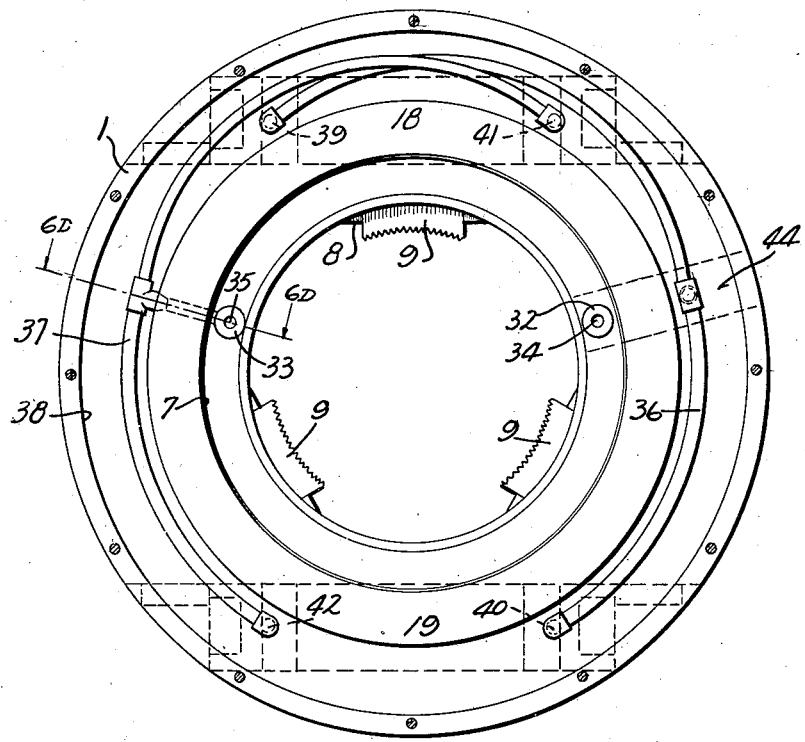
Fig. 6C is a view of the chuck of Fig. 6, viewed from the opposite direction in Fig. 1.
Figure 6D:
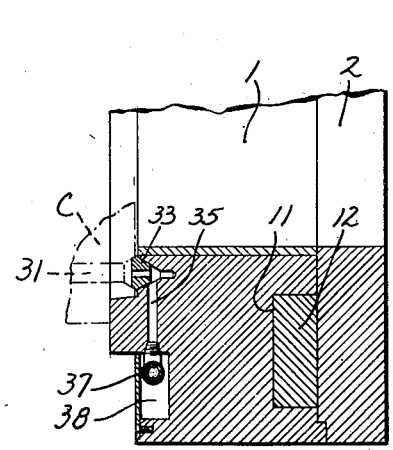
Fig. 6D is a partial section taken approximately along line 6D—6D of Fig. 6C.
Figure 6E:
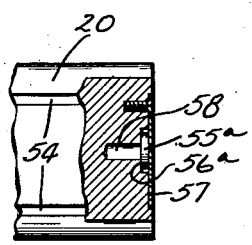
Fig. 6E is an enlarged partial detail, partly in section, of one of the pistons of the chuck shown in Fig. 6.
Figure 6F:
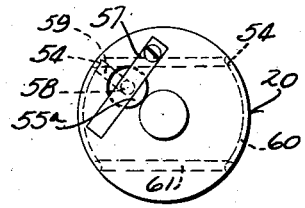
Fig. 6F is the same piston, viewed from the right in Fig. 6E.

The chuck shown in Figs. 6 to 6F is the same chuck as is shown in Fig. 1 of the co-pending application previously mentioned. It comprises a main body portion 1 and another body portion 2 rigidly fixed therewith by the means of screws such as 3—4, and adapted to be fitted with spindle $c$ by the means of screws such as 6, Fig. 6A, and centered by an annular recess 7 fitting a complementary annular spindle portion. The members or portions 1 and 2 together provide a substantially annular chuck body fitted co-axially with the spindle $c$.

The body member 2 is slotted to provide guides for closely fitted members such as 8, each movable toward and from the axis of the spindle $c$. On the members 8 there may be mounted jaw members such as the members 9, or of other suitable forms, fixed with the members 8 by screws such as 10, or by other suitable means. The members 8 are preferably substantially equiangularly spaced, in order to provide a running balance for the chuck unit.

In the body member 1 there is provided an annular recess 11 in which a ring 12 is closely but rotatably fitted. At the points where the ring member 12 is adjacent to the members 8, pins such as 13 are fixed therein and extended within cam recesses such as 14 in the members 8, the cam recesses being adapted to receive follower rolls such as 15 carried by the pins 13. The form of the cam recesses 14 is such that, as the ring 12 is rotated in the one direction, the members 8 are first quickly simultaneously moved toward the axis of the ring annulus, during the first part of the ring movement, while the rolls 15 are passing over a portion such as 16 of the cam path, and during the latter part of the ring movement in the same direction the members 8 are relatively much more slowly moved by a cam portion 17 having relatively slight effective angle. The angle of the cam portion 17 is such that the ring may move the members 8, but pressure on the members in the other direction will not reversely move the ring. In other words the connection is self locking in the one direction of movement and after the members arrive at clamping position. In the other direction of movement of the ring 12 the members 8 are first unclamped, during movement of the rollers 15 over the cam portion 17, and then quickly moved to the fully opened position by the movement of the rollers 15 over the cam portions 16.

For movement of the ring 12 there are provided two piston devices respectively denoted as 18, 19. The piston devices 18, 19 are similar, each including a piston such as 20 closely fitted within a bore such as 21 providing a cylinder in the body 1, which is closed at the ends by plugs such as 22, 23 tightly fitted in the bore and retained in position by abutment blocks such as 24, 25 and screws such as 26, 27. The pistons 20 are also equi-angularly spaced in order to balance the chuck, and are each connected for movement of the ring 12 by the means of pins such as 28 fixed in the ring 12 and projecting into recesses such as 29 at the center of the piston. It may be noted that in the case of the uppermost piston, Fig. 6, a combination pin is used which is fixed in the ring and extends in both directions to connect the ring both with the member 8 and the piston 20.

Each of the piston devices 18, 19 is provided with fluid supply channels for the operation of the pistons in either direction. Pressure fluid is received from spindle c through the one or the other of channels 30 or 31, Figs. 6B and 6D, according to the position of control means later described. The chuck includes pressure coupling devices 32, 33 for the respective supply channels, from which the fluid is passed to the channels 34 or 35 within the chuck body. The channels 34, 35 are respectively connected to supply pipe channels 36, 37, Fig. 6C, housed in an annular groove 38 at the rear of the chuck body. The piston devices 18, 19 are respectively provided with port openings 39 and 40 which, when supplied with pressure fluid simultaneously shift both of the pistons in a direction to move the clamp members 8 and jaws 9 inwardly toward a clamping position, and each of the ports 39 and 40 is connected with the pipe channel 36 by suitable pipe fittings and holes, not shown, drilled in the body portion 1 whereby to simultaneously operate both piston devices to move the members 8 and jaws 9 in the clamping direction whenever pressure fluid is received through the channel 30, Fig. 6.

Each of the piston devices 18, 19 is provided with ports such as 41, 42, similarly connected to simultaneously receive fluid from the pipe channel 37 and supply channel 31 for movement of the chuck jaws in the reverse, or unclamping direction.

A pressure indicator, generally denoted by the numeral 43 is connected to receive pressure fluid from the same channel which supplies the port 39 or 40, whereby to indicate the fluid pressure operative during a clamping operation. This device may be of any suitable form, providing relatively movable scale and indicator members, whereby the pressure may be visibly indicated, and since a variety of such indicators are well known it will not be described in detail. The device may be positioned at any suitable point on the chuck body but preferably within the confines of the body annulus, whereby it will be protected during rotation of the chuck.

Within the chuck body portion 1, and between the channels 34 and 36, whereby to be in the pressure line which effects the clamping direction of movement and also operates the indicator 43, is a pressure regulating device generally denoted by the numeral 44, Fig. 6B. This device includes a plunger 45 carried within a sleeve 46 and having a central groove 47 normally providing a path of communication between an inlet port 48 connected with the channel 34, and an outlet port 49 connected with the pipe channel 36. The end 50 of the plunger 45 is exposed to the pressure from inlet port 48, through a channel 51, such pressure tending to move the plunger 45 downwardly in Fig. 6B against the resistance of a spring 52, the one end of the spring abutting an adjustable screw member 53 by the means of which the spring pressure may be adjusted. The area of the plunger end 50 is so proportioned relative to the strength of the spring 52 that the spring will maintain the plunger in position to open the port 48 so long as the pressure in channel 36 does not exceed a predetermined maximum. If this maximum is exceeded the pressure acting on the end 50 of the plunger will force the plunger to a position closing the port 48. It is obvious that the point of predetermined pressure can be altered by adjusting the spring abutment screw 53, and the actual pressure point at which the pressure is cut off, may be determined by the reading of the indicator 43. This is very useful, for instance, where pieces which might be deformed under heavy pressure are to be held in the clamp jaws.

In the chuck described, unless prevented, fluid may pass along the pistons 20 toward the pins which connect the pistons with ring 12, and leak out of the chuck around the ring 12 and members 8. In order to avoid such leakage the following means are provided: In the surface of the pistons 20, and completely surrounding the space occupied by the connecting pins, there is provided a groove such as the groove 54, Figs. 6 and 6A.

Fluid which otherwise would leak out as described is received in the grooves 54 before it reaches the connecting pins. Grooves 54 are connected to one way valves 55, 56 at each end thereof, permitting fluid to pass outwardly into the cylinder portions adjacent the piston but not inwardly toward the groove. These valves each include a member 55a, Figs. 6E, 6F, pressed against a valve seat 56a by means of a spring 57. Channels such as 58, Figs. 6, 6E, are connected to receive fluid from the grooves 54 through drilled holes such as 59. The normal control and operation of the piston devices 18, 19, require that one or the other end of the pistons shall be free from pressure. Therefore, by reason of the plurality of one way valves 55, it results that there is at all times one end of each cylinder which may receive the leakage fluid from the channel 54, which then passes out of the chuck through the cylinder port and through the one or the other of the spindle passages 30, 31.

The area enclosed within the leakage receiving groove 54 is, by the construction described, relieved from pressure, and to balance the piston pressure there are provided grooves, such as groove 60, Fig. 6A, similar to grooves 54 and enclosing an equal area on the opposite side of the pistons. The groove 60 and the groove 54 are connected by drilled channels such as 61 in order that the fluid from both grooves 54, 60 may pass out through the one way valves.

A variety of forms of chuck may be used having jaw operating structure which may be fluid operated, as for instance by fluid supplied from channels such as 30, 31.

Figure 3:
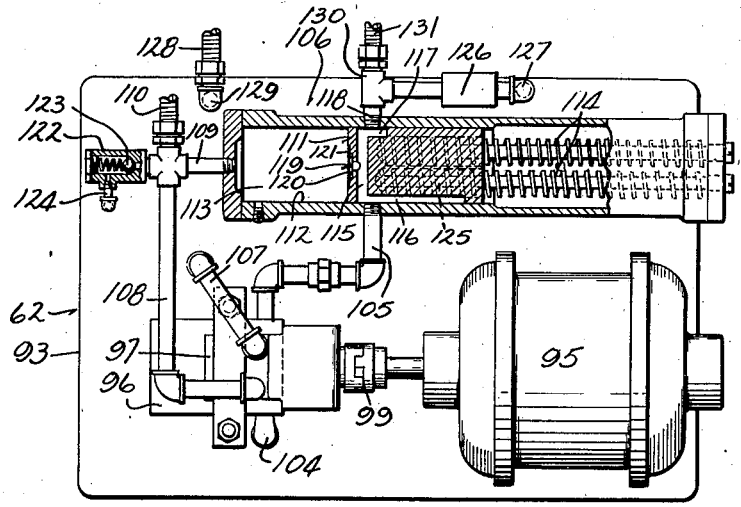
Fig. 3 is a plan view of the structure of Fig. 2.
Figure 2:
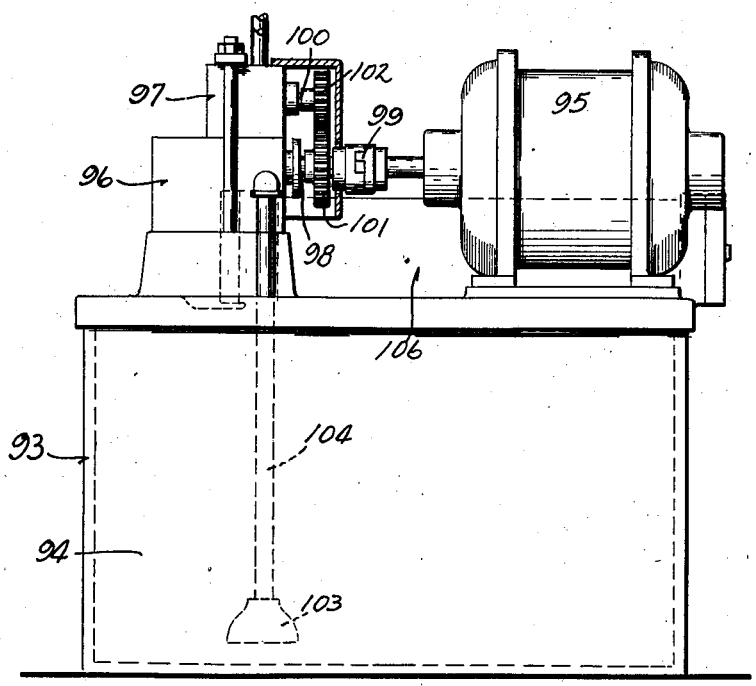
Fig. 2 is an enlarged front view of a unit shown at the left in Fig. 1.

The channels 30, 31 are supplied with fluid preferably lubricating oil, from a transmission and control which in this instance includes a reservoir, pump and accumulator unit generally denoted by the numeral 62, Figs. 1, 2, 3, a valve and rotatable coupling unit 63, Figs. 1, 4, and channels associated with spindle c such as the channels generally denoted by the numerals 64, 64a, Fig. 4, which respectively receive fluid through annular grooves 65, 66, Fig. 4. The channels 64, 64a are similar and therefore only the channel 64 will be described. Passages 67, 67a, Fig. 4, leading from the annular groove 65, 66 communicate through a pipe fitting such as 68 to a pipe such as 69 which fits tightly into a bore such as 70 formed in spindle c and extended forward to communicate with bore 31 for the supply channel 64 and the bore 30 for the supply channel 64a.

The rotatable coupling unit 63 includes an inner member 70, Fig. 4, fixed for rotation with spindle c, an outer member 71, and a sleeve 72 fixed with member 71 and having a conical bore 72a closely but rotatably fitted to a complementary conical exterior surface 70a on the sleeve 70. Sleeve 72 and member 71 may be adjusted axially by a nut 73 to maintain the tapered surfaces in substantially leakless relationship. Member 71 carries a pressure reversing control valve generally denoted by the numeral 74, Figs. 4, 5, which includes a rotatable valve member 75 having portions cut away at 76, 77 to provide passages which together will effect communication between port passages 78, 79, respectively suitably connected to supply fluid to annular grooves 65, 66, and port passages 80, 81 respectively suitably connected to receive fluid from a pressure fluid supply channel 82 and a drain channel 83.

The arrangement is such that rotation of valve member 75 in the one direction, to the position shown in Fig. 4, will connect pressure fluid to one end of the pistons 20, 20, Fig. 6, of chuck e, through the channel 64a, Fig. 4, and the pipe channel 36, Fig. 6C, of the chuck, to pressure supply channel 82 to effect clamping movement of the chuck jaws 9, at the same time connecting the other end of pistons 20, 20 to the drain channel 83, Fig. 4. Rotation of valve member 75 in the opposite direction will oppositely connect the chuck pistons to effect unclamping.

Valve member 75 may be oscillated, to effect alternative clamping and unclamping operation of chuck e, by the means of a shaft 84, Fig. 4, a lever 85 and a rod 86, Figs. 1, 4, which is pivoted at the one end with lever 85, and extended to carry a manual hand grip portion 87 at a point adjacent the normal position of the operator of the machine.

Figure 5:
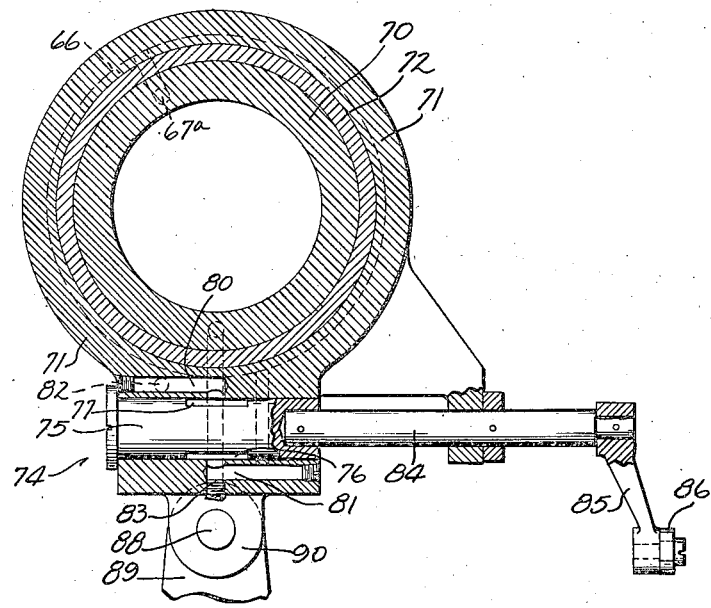
Fig. 5 is an enlarged partial vertical section taken approximately along line 5—5 of Fig. 1.

The member 71, Figs. 4, 5, is prevented from rotation by the means of a pin 88 fixed in a bed bracket 89, Figs. 1, 5, and slidably fitting in an ear or lug 90.

Any liquid which tends to leak from the rotating joint between members 70, 72, Fig. 4, is received in annular channels 91, 92 and returned to the drain channel 83 through channels such as 91a, 92a.

The pressure fluid supply unit 62, Figs. 1, 2, 3, includes a base 93, providing a reservoir 94, a driving motor 95, a pump generally denoted by the numeral 96 and another pump 97 of relatively small delivery volume. Pumps 96, 97 may be of any suitable well known form for positive fluid delivery, such as gear type pumps, and are therefore not shown in detail.

Pump 96 includes a drive shaft 98, Fig. 2, driven from motor 95 through a coupling 99, and pump 97 includes a drive shaft 100 driven from motor 95 through shaft 98 and a pair of meshed gears 101, 102.

Pump 96 draws liquid from reservoir 94 through a strainer 103 and a pipe channel 104, and delivers liquid through a pipe channel 105 to an accumulator device generally denoted by the numeral 106, Fig. 3. Pump 97 draws liquid from reservoir 94 through a similar strainer, not shown, and a pipe channel 107, Fig. 3, and delivers liquid to a pipe channel 108 which is simultaneously connected to accumulator 106 through a pipe channel 109, and to the pressure supply channel 82, Fig. 4, of the valve 74, through a flexible tube channel 110, Figs. 3, 4.

The accumulator 106, Fig. 3, includes a piston or plunger 111 operating in a cylinder 112, which at the one end provides an accumulator chamber 113, the piston 111 being continuously urged in the direction of chamber 113 by springs such as 114, 114.

Piston 111 provides a passage 115 opening at the one end into a groove 116, which communicates with pipe channel 105 in all positions of the piston, and opening at the other end into a relatively shorter groove 117 which communicates with a pipe channel 118, but only after chamber 113 has been filled to its intended maximum capacity, as in the piston position shown in Fig. 3. At other times, when chamber 113 is partly or completely empty the piston 111 stands to the left of the Fig. 3 position and groove 117 is then closed against delivery to pipe channel 118, fluid from pump 96 then passing into the chamber 113 through a one way valve device 119 similar to those at the ends of pistons 20, already described, and including a valve member 120 normally seated by a spring 121.

An overload relief or by-pass valve 122, Fig. 3, includes a spring pressed ball 123, and serves to return liquid from the pump 97 to the reservoir 94 through a suitable channel such as 124, but only after the chamber 113 is filled with liquid. Stop means for the right hand movement, Fig. 3, of the piston 111 may be provided, as for instance rod 125, which abuts the piston at the bottom of one of the bores which receive springs 114, 114.

Fluid from pump 96 could pass into chamber 113 through valve device 119 at all times except that the pressure in chamber 113 is normally higher than the pressure in channel 115. Thus in the piston position shown in Fig. 3 the maximum fluid pressure in channel 115, Fig. 3, is determined by a relatively low pressure relief valve 126, which is similar in construction to relief valve 122 and returns by-passed fluid to reservoir 94 through a channel such as 127.

Fluid from the drain channel 83, Fig. 4, of valve 74 is returned to reservoir 94 through a flexible tube channel 128, Figs. 3, 4, and a channel such as 129.

Pump 97 operates continuously against the relatively heavy pressure of relief valve 122, and therefore is preferably of a relatively low capacity, sufficient however to continuously supply an excess over the volume of fluid which unavoidably leaks out of the pressure channels supplying chuck e, to be returned to the reservoir 94 as previously described. This fluid leakage would be similarly supplied from pump 96 if pump 97 were inoperative for any reason, or were not used, because the connections described for pump 96 will maintain the chamber 113 filled with liquid, but with the construction as shown the pump 96 operates to supply accumulator liquid principally only at such times as liquid is drawn from chamber 113 at a relatively rapid rate, as for instance during clamping or unclamping of chuck e.

At all other times pump 96 is continuously supplying liquid to a delivery pipe 130, Fig. 3, from which it can be drawn for the supply of liquid for other purposes. In the present instance the liquid used is lubricating oil, and the pipe 130 is connected through suitable channels, such as a flexible tube 131, Figs. 3, 4, a tube 132, and channels 133, 134, for the supply of lubricant to various bearings of the lathe transmission, such as the spindle bearings 135, 136, Fig. 4. The transmission gearing such as the gears 137, 138, on spindle c, are also sprayed with lubricant, as for instance by small perforations, not shown, at points 139, 140 in the pipe 132.

The liquid thus utilized for lubrication of the machine is collected by gravity in reservoirs such as the reservoir 141, Fig. 4, in the bed a; and returned to reservoir 94 in the unit 62 through suitable channels such as the flexible tube 142.

What is claimed is:

1. In a machine tool, the combination of a bed, a spindle rotatably supported from said bed, a plurality of bearings for said spindle spaced apart along the spindle axis, a chuck removably fixed on one end of said spindle and including a plurality of relatively movable jaw members, a piston device carried by and removable with said chuck, a mechanical motion transmitting connection from said piston device for said relative movement of the jaw members from said piston device, said mechanical connection including an annular ring rotatable co-axial with said spindle and elements irreversibly cooperative to prevent movement of said ring from said jaw members, a pressure fluid supply source, and a pressure fluid passageway connecting said source and piston device including a channel extended axially of said spindle and inside the annular bearing surface of one of said bearings.

2. In a machine tool, the combination of a bed, a spindle rotatably supported from said bed, a plurality of bearings for said spindle spaced apart along the spindle axis, a chuck removably fixed on the end of said spindle and including a plurality of relatively movable jaw members, a piston device, a mechanical motion transmitting connection from said piston device for said relative movement of the jaw members, said mechanical connection including an annular ring rotatable co-axial with said spindle and elements irreversibly cooperative to prevent movement of said ring from said jaw members, a pressure fluid supply source, a plurality of relatively rotatable elements associated with the other spindle end and one of which is fixed with said spindle for rotation therewith, and a pressure fluid passageway connecting said source for operation of said piston device and including a channel passing through said relatively rotatable elements and through one of said bearings inside the annular bearing surface thereof, in the order recited.

3. A lathe, as specified in claim 2 in which said relatively rotatable elements include closely fitted mutually co-acting bearing surfaces of conical form coaxial with the spindle.

4. In a lathe, the combination of a bed, a carriage horizontally movable thereon, said bed providing slideways for said carriage movement, a spindle rotatably supported from said bed at a level above said slideways and axially parallel to the direction of said carriage movement, a plurality of annular bearings for said spindle spaced apart along the spindle axis, a chuck including a substantially annular body removably fixed on the end of said spindle adjacent said slideways and including a plurality of relatively movable jaw members, a piston device carried by and housed within said annular body, a mechanical motion transmitting connection from said piston device for said relative movement of the jaw members, said mechanical connection including elements irreversibly cooperative to prevent movement of said piston device from said jaw members, a pressure fluid supply source, a plurality of relatively rotatable elements, one of which is fixed with said spindle for rotation therewith, and a pressure fluid passageway connecting said source for operation of said piston device through said relatively rotatable elements and through one of said bearings inside the annular bearing surface thereof, in the order recited, said passageway including portions connecting said spindle and chuck body for passage of pressure fluid into the chuck body and disconnectible for removal of said chuck body from said spindle.

5. In a lathe, the combination of a bed, a carriage horizontally movable thereon, said bed providing slideways for said carriage movement, a spindle rotatably supported from said bed at a level above said slideways and axially parallel to the direction of said carriage movement, a plurality of annular bearings for said spindle spaced apart along the spindle axis, a chuck including a substantially annular chuck body removably fixed on the end of said spindle adjacent said slideways and including a plurality of relatively movable jaw members, a piston device carried by and housed within said annular body, a mechanical motion transmitting connection from said piston device for said relative movement of the jaw members, said mechanical connection including elements irreversibly cooperative to prevent movement of said piston device from said jaw members, a pressure fluid supply source, control valve means including a member shiftable for valve adjustment, a plurality of relatively rotatable elements one of which is fixed with said spindle for rotation therewith, and a pressure fluid channel connecting said source for operation of said piston device through said control valve, said relatively rotatable elements and one of said bearings inside the annular bearing surface thereof, in the order recited.

6. In a lathe, the combination of a bed, a carriage horizontally movable thereon, said bed providing slideways for said carriage movement, a spindle rotatably supported from said bed at a level above said slideways and axially parallel to the direction of said carriage movement, a plurality of annular bearings for said spindle spaced apart along the spindle axis, a chuck including a substantially annular chuck body removably fixed on the end of said spindle adjacent said slideways and including a plurality of relatively movable jaw members, a piston device carried by and housed within said annular body, a mechanical motion transmitting connection from said piston device for said relative movement of the jaw members, said mechanical connection including elements irreversibly cooperative to prevent movement of said piston device from said jaw members, a pressure fluid supply source, an accumulator device receiving fluid from said supply source, control valve means including a member shiftable for valve adjustment, a plurality of relatively rotatable elements one of which is carried by said spindle for rotation therewith, and a pressure fluid channel connecting said accumulator for operation of said piston device through said relatively rotatable elements and one of said bearings inside the annular bearing surface thereof, in the order recited.

7. In a lathe, the combination of a bed, a carriage horizontally movable thereon, said bed providing slideways for said carriage movement, a spindle rotatably supported from said bed at a level above said slideways and axially parallel to the direction of said carriage movement, a plurality of bearings for said spindle spaced apart along the spindle axis, a chuck including a substantially annular chuck body removably fixed on the end of said spindle adjacent said slideways and including a plurality of relatively movable jaw members, a piston device carried by and housed within said annular body, a mechanical motion transmitting connection from said piston device for said relative movement of the jaw members, said mechanical connection including elements irreversibly cooperative to prevent movement of said piston device from said jaw members, a pressure fluid supply source, leak receiving means associated with said piston device and housed within said annular body for receiving the fluid leakage from said piston device, and a plurality of channels each including a portion extended axially of said spindle within the annular bearing surface of one of said bearings, one of said channels connecting said pressure source and piston device and the other of said channels being connected to receive fluid from said leak receiving means.

8. In a lathe, the combination of a bed, a carriage horizontally movable thereon, said bed providing slideways for said carriage movement, a spindle rotatably supported from said bed at a level above said slideways and axially parallel to the direction of said carriage movement, a plurality of bearings for said spindle spaced apart along the spindle axis, a chuck including a substantially annular body removably fixed on the end of said spindle adjacent said slideways and including a plurality of relatively movable jaw members, a piston device carried by and housed within said annular body, a mechanical motion transmitting connection from said piston device for said relative movement of the jaw members, said mechanical connection including elements irreversibly cooperative to prevent movement of said piston device from said jaw members, a pressure supply source connected for operation of said piston device, leak receiving means associated with said piston device and housed within said annulus for receiving leakage from said device, and a channel connected at the one end to receive fluid from said leak receiving means and including a portion extended axially of said spindle and inside the annular bearing surface of one of said bearings.

9. In a lathe, the combination of a bed, a carriage horizontally movable thereon, said lathe providing guideways for said carriage movement, a spindle rotatably supported from said bed at a level above said slideways and axially parallel to the path of carriage movement, a bearing for said spindle, a chuck removably fixed at the end of said spindle adjacent said slideways and including relatively movable jaws and a fluid operable piston device connected for movement of said jaws and unitarily removable with said chuck, said chuck being to the one side of a plane vertical to the axis of said spindle and coinciding with the chuck end of said bearing, pressure liquid supply means connected for operation of said piston device, leak collecting means associated with said piston device, and channel means connected to receive leakage liquid from said leakage collecting means and to deliver said leakage liquid to a point at the other side of said vertical plane.

10. In a lathe, the combination of a bed, a cariage horizontally movable thereon, said bed providing slideways for said carriage movement, a spindle rotatably supported from said bed at a level above said slideways and axially parallel to the direction of said carriage movement, a plurality of bearings for said spindle spaced apart along the spindle axis, a chuck including a substantially annular body removably fixed on the end of said spindle adjacent said slideways and including a plurality of relatively movable jaw members, a piston device carried by and housed within said annular body, a mechanical motion transmitting connection from said piston device for said relative movement of the jaw members and including elements irreversibly cooperative to prevent movement of said piston device from said jaw members, said piston device being fluid operable in opposite directions respectively for clamping and releasing movement of said jaw members, a pressure fluid source, a plurality of channels respectively for connecting said source and piston device for the one direction and for the other direction of device movement, and valve means for alternatively selecting the connection of said channels to effect said different directions of device movement, each of said channels including a portion extending axially of said spindle and inside the annular bearing surface of one of said bearings.

11. In a machine tool, the combination of a chucking device including relatively movable jaws, means for said relative movement including a liquid operable piston device mechanically connected with one of said jaws, and fluid supply means for said piston device including a first power operable pump, a second power operable pump, an accumulator for storage of liquid under pressure, channel means connectible for each of said pumps to charge said accumulator, and liquid by-pass means effective on the delivery of said second pump and effective only when the liquid in said accumulator reaches a predetermined volume.

12. In a machine tool, the combination of a chucking device including relatively movable jaws, means for said relative movement including a liquid operable piston device mechanically connected with one of said jaws, and fluid supply means for said piston device including a first power operable pump, a second power operable pump, an accumulator for storage of liquid under pressure, a plunger movable in accordance with changes in the volume of liquid in said accumulator, a channel connecting said first pump to charge said accumulator irrespective of the position of said plunger, and another channel connecting said second pump to charge said accumulator only through a predetermined range of movement of said plunger.

13. In a machine tool, the combination of a chucking device including relatively movable jaws, means for said relative movement including a liquid operable piston device mechanically connected with one of said jaws, an accumulator connectible for the supply of liquid to said piston device, a plunger movable in accordance with changes in the volume of liquid in said accumulator, a lubricating system for said lathe, a pump, and valve means shiftable in accordance with the movement of said plunger for connecting said pump alternatively for charging said accumulator or for the supply of liquid to said lubricating system.

14. In a machine tool the combination of a chucking device including relatively movable jaws, means for said relative movement including a liquid operable piston device mechanically connected with one of said jaws, an accumulator connectible for the supply of liquid to said piston device, a plunger movable in accordance with variations in the volume of liquid within said accumulator, another device, a power operable pump, and channel means alternatively connectible to connect said pump to charge said accumulator or to operate said other device exclusive of said accumulator, said channel means including valve means controlling the alternative connection of said channel means and connected for operation in accordance with the position of said plunger.

15. In a machine tool the combination of a rotatable spindle, a chucking device fixed at the end of said spindle and including relatively movable jaws and a fluid operable piston device connected for movement of said jaws, pressure fluid supply means connectible for operation of said piston device including a reservoir, a power operable pump drawing fluid from said reservoir, a plurality of channels respectively for movement of said piston device in opposite directions, control valve means shiftable for alternative connection of either of said channels to receive fluid from said pump and simultaneously connecting the other channel to return fluid to said reservoir, leak connecting means associated with said piston device to receive fluid leaking therefrom in either connection of said channels, and one way valve means operatively connecting said leak collecting means in either position of said control valve means to deliver fluid to the one of said channels which is delivering fluid to said reservoir.

16. In a machine tool the combination of a rotatable spindle, a chucking device fixed at the end of said spindle and including relatively movable jaws and a fluid operable piston device connected for movement of said jaws, pressure fluid supply means connectible for operation of said piston device including a reservoir, a power operable pump drawing fluid from said reservoir, a channel for supply of fluid to said piston device, leakage collecting means associated with said piston device, and channel means connecting said leak collecting means for the return of leakage fluid to said reservoir.

17. In a lathe, the combination of a bed, a carriage mounted thereon for horizontal movement, a spindle horizontally rotatably supported at one end of said bed and axially extended in the direction of said carriage movement, a spindle bearing, said spindle having ends respectively projecting axially in opposite directions from said bearing, a chuck fixed on the spindle end projecting in the direction of said carriage, said chuck including movable jaw members and a piston device, a fluid pressure source associated with said lathe, valve means for controlling pressure from said source, a plurality of relatively rotatable elements associated with the other end of said spindle, a pressure channel connecting said source through said valve means and relatively rotatable members and through said bearing in the order recited to operate said piston device, and valve operating means including an element positioned for manual operation adjacent said chuck.

18. In a machine tool the combination of a rotatable spindle, a bearing for said spindle, said spindle having ends respectively projecting axially in opposite directions from said bearing, a chuck fixed at the one end of said spindle and including relatively movable clamping members, a piston device associated with said chuck, a mechanical motion transmission from said piston device to said clamping members, a pressure fluid source, a plurality of relatively rotatable elements associated with the other end of said spindle and including closely fitted mutually co-acting bearing surfaces of conical form co-axial with the spindle, and a fluid pressure passageway connecting said source for operation of said piston device and including a channel passing through said relatively rotatable elements and through said bearing in the order recited.

19. In a machine tool the combination of a rotatable spindle, a bearing for said spindle, said spindle having ends respectively projecting axially in opposite directions from said bearing, a chuck fixed at the one end of said spindle and including relatively movable clamping members, a piston device associated with said chuck, a mechanical motion transmission from said piston device to said clamping members, a pressure fluid source, a plurality of relatively rotatable elements associated with the other end of said spindle and including closely fitted mutually co-acting bearing surfaces of conical form co-axial with the spindle, valve means controlling said pressure source, a fluid pressure passageway connecting said source for operation of said piston device including a channel passing through said valve means, said relatively rotatable elements and through said bearing in the order recited, and control means for said valve means including an element positioned for manual operation adjacent said chuck.

LOUIS EDWARD GODFRIAUX.